United States Patent
Krisko

[11] Patent Number: 6,060,178
[45] Date of Patent: *May 9, 2000

[54] HEAT TEMPERABLE TRANSPARENT GLASS ARTICLE

[75] Inventor: Annette J. Krisko, Prairie du Sac, Wis.

[73] Assignee: Cardinal IG Company, Minnetonka, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/866,529

[22] Filed: May 30, 1997

Related U.S. Application Data

[63] Continuation-in-part of application No. 08/798,742, Feb. 13, 1997.
[60] Provisional application No. 60/020,588, Jun. 21, 1996.

[51] Int. Cl.[7] .............................. C03C 17/36; B32B 15/00
[52] U.S. Cl. .................... 428/627; 428/212; 428/216; 428/433; 428/432; 428/336; 428/472; 428/621; 428/629; 428/632; 428/698; 359/359; 359/360; 359/585
[58] Field of Search .................... 428/428, 426, 428/432, 216, 212, 336, 701, 702, 469, 472, 621, 632, 629, 622, 627

[56] References Cited

U.S. PATENT DOCUMENTS

| | | |
|---|---|---|
| 3,885,855 | 5/1975 | Gross . |
| 4,045,125 | 8/1977 | Farges . |
| 4,166,018 | 8/1979 | Chapin . |
| 4,619,729 | 10/1986 | Johncock et al. . |
| 4,737,379 | 4/1988 | Hudgens et al. . |
| 4,773,717 | 9/1988 | Pai et al. . |
| 4,790,922 | 12/1988 | Huffer . |
| 4,806,220 | 2/1989 | Finley . |
| 4,894,290 | 1/1990 | Chesworth et al. ................ 428/432 |
| 4,902,081 | 2/1990 | Huffer . |
| 4,919,778 | 4/1990 | Dietrich et al. ..................... 65/106 |
| 5,000,528 | 3/1991 | Kawakatsu . |
| 5,135,808 | 8/1992 | Kimock et al. . |
| 5,168,003 | 12/1992 | Proscia . |
| 5,190,807 | 3/1993 | Kimock et al. . |
| 5,268,217 | 12/1993 | Kinock et al. . |
| 5,271,994 | 12/1993 | Termath . |
| 5,296,302 | 3/1994 | O'Shaughnessy et al. . |
| 5,302,449 | 4/1994 | Ehy et al. . |
| 5,318,685 | 6/1994 | O'Shaughnessy . |
| 5,337,191 | 8/1994 | Austin . |
| 5,344,718 | 9/1994 | Hartig et al. . |
| 5,354,446 | 10/1994 | Kida et al. . |
| 5,372,874 | 12/1994 | Dickey et al. . |
| 5,377,045 | 12/1994 | Wolfe et al. . |
| 5,411,794 | 5/1995 | Kawaguchi et al. . |
| 5,508,092 | 4/1996 | Kimock et al. . |
| 5,543,229 | 8/1996 | Ohsaki et al. . |
| 5,688,585 | 11/1997 | Lingle et al. . |
| 5,718,980 | 2/1998 | Koch et al. ........................ 428/428 |

FOREIGN PATENT DOCUMENTS

| | | |
|---|---|---|
| 1 222 912 | 6/1987 | Canada . |
| 0 104 870 | 4/1984 | European Pat. Off. . |
| 0 464 701 | 1/1992 | European Pat. Off. . |
| 0 343 695 | 11/1994 | European Pat. Off. . |
| 0 622 645 | 11/1994 | European Pat. Off. . |

(List continued on next page.)

*Primary Examiner*—Archene Turner
*Attorney, Agent, or Firm*—Fredrikson & Byron, P.A.

[57] ABSTRACT

A heat-resistant transparent glass article is formed with a film stack deposited on a glass substrate, the film stack comprising one or more infrared reflective films each bearing on its surface facing away from the substrate a barrier film of niobium metal having a thickness of up to 25 Å and preferably in the range of about 7 Å to 20 Å. A barrier film of niobium metal or, preferably, a metal oxide may be formed on the other surface (facing the substrate) of each infrared reflective film. Metal nitride films such as silicon nitride may be employed between neighboring infrared reflective films, and as an outer protective film.

16 Claims, 1 Drawing Sheet

FOREIGN PATENT DOCUMENTS

| | | |
|---|---|---|
| 0 678 484 | 4/1995 | European Pat. Off. . |
| 0 718 250 | 6/1996 | European Pat. Off. . |
| 0 722 913 | 7/1996 | European Pat. Off. . |
| 0 747 330 | 12/1996 | European Pat. Off. . |
| 0 761 618 | 3/1997 | European Pat. Off. . |
| 6216945 | 7/1987 | Japan . |
| 7233469 | 5/1995 | Japan . |
| WO 91/14016 | 9/1991 | WIPO . |

HEAT TEMPERABLE TRANSPARENT GLASS ARTICLE

This application is a continuation-in-part of Ser. No. 08/798,742 filed Feb. 13, 1997. This Application also claims the benefit of U.S. Provisional Application Ser. No. 60/020,588 filed Jun. 21, 1996.

FIELD OF THE INVENTION

This invention is directed to transparent coatings for glass substrates, and particularly to glass substrates having coatings that are capable of withstanding high temperatures such as those encountered during glass tempering and bending, and those encountered during the cleaning cycle of self cleaning ovens.

BACKGROUND OF THE INVENTION

Glass sheets can be coated with a stack of transparent, metal-containing films to vary the optical properties of the coated sheets. Particularly desirable are coatings characterized by their ability to readily transmit visible light while minimizing the transmittance of other wavelengths of light, especially light in the infrared spectrum. These characteristics are useful for minimizing radiative heat transfer without impairing visibility, and coated glass of this type is useful as architectural glass, glass for use as automobile windows, etc.

Coatings having the characteristics of high transmittance and low emissivity commonly include film stacks having one or more thin metallic films with high infrared reflectance that are disposed between antireflective dielectric films such as metal oxide films. The metallic films may be silver, and the metal oxide films may be the oxides of various metals and metal alloys including zinc, tin, titanium, etc. Films of the type described commonly are deposited on glass substrates on a commercial production basis through the use of well known magnetron sputtering techniques.

It is often necessary to heat glass sheets to temperatures at or near the melting point of the glass to temper the glass or to enable the glass to be bent into desired shapes such as motor vehicle windshields. Coated glass articles often must be able to withstand high temperatures for periods of time up to several hours. Tempering, as is known, is particularly important for glass intended for use as automobile windows and particularly for use as automobile windshields; upon breaking, windshields desirably exhibit a break pattern in which they shatter into a great many small pieces rather than into large, dangerous sharp shards. Tempering temperatures on the order of 600° C. and above are required. Film stacks employing silver as an infrared reflective film often cannot withstand such temperatures without some deterioration of the silver film. To avoid this problem, glass sheets can be heated and bent or tempered before they are coated, and later can be provided with the desired metal and metal oxide coatings. Particularly for bent glass articles, this procedure may produce non-uniform coatings and is costly.

Another reported method for protecting a reflective metal film such as silver from deterioration at high temperatures involves sandwiching the silver film between protective films of an oxidizable metal such as titanium, these protective metal films being of sufficient thickness so that when a coated glass is heated to high temperatures, the protective metal films oxidize. Inasmuch as thin films of the oxides of metals commonly are more transparent than thin films of the metals themselves, the transmissivity of glass sheets bearing such coatings tends to increase upon heating. Reference is made to Huffer et al. U.S. Pat. No. 4,790,922 and Finley U.S. Pat. No. 4,806,220.

U.S. Pat. No. 5,344,718 (Hartig et al.) describes the use of a film stack in which silver is sandwiched between films of nickel or nichrome, and the resulting sandwich is sandwiched between films of $Si_3N_4$, the glass article having particular values of transmittance and emissivity. It is said that when a Ni:Cr (50:50) alloy is employed, the chromium during sputtering is converted at least in part to a nitride of chromium and that visible transmittance thus is improved. The ability of nickel, chromium and chromium nitride to transmit visible light, however, is not great, and as a result the transmissivity of glass articles that include films of nichrome may be somewhat less than desired.

The above description pertains primarily to efforts to produce glass structures useful as architectural glass or glass for automobile windows, in which the glass structures in use are not usually subjected to high temperatures after they have once been tempered or bent. Coated glass sheets may also find utility as windows for ovens of various types in which the windows are subjected to repeated heating and cooling cycles as the ovens are heated and cooled during normal usage. A good example of such usage is a self-cleaning kitchen oven in which the oven temperature may be repeatedly raised to cooking temperatures of 250° F. to 450° F. with frequent excursions to e.g., 900° F. during cleaning cycles. An oven window of this type should be transparent to enable one to see through it into the oven. It should be highly reflective in the infrared range to retard heat loss from the oven and help keep the exterior of the oven from getting too hot. Further, it must be resistant to deterioration resulting from repeated temperature escalations while exposed to the conditions of humidity and chemical (food) oven conditions.

SUMMARY OF THE INVENTION

In one embodiment, the invention provides a transparent, heat-resistant glass article comprising a glass substrate and a transparent film stack deposited upon the substrate. The film stack comprises, from the glass substrate outwardly, a transparent infrared reflective metallic film and a protective barrier film of niobium metal deposited directly on the infrared reflective film. The thickness of the niobium metal film may range up to 25 Å, preferably in the range of from 7 Å to 20 Å

The film stacks of the invention may consist of one, two or more infrared reflective metallic films, preferably one or two silver films, each infrared reflective metallic film bearing directly on its surface facing away from the substrate a protective niobium film of a thickness up to 25 Å in thickness, preferably up to 20 Å, and most preferably in the range of from 7Å to 20 Å. On the other surface of the infrared reflective films (the surface facing the substrate) may be deposited a protective film of niobium or, preferably, a metal oxide such as an oxide of zinc, niobium or titanium, the oxide film being present at a thickness sufficient to protect the metal film from deterioration during high temperature processing. Zinc oxide films in the range of 50 to 250 Å in thickness are preferred. Desirably, a zinc oxide film of from about 100 to about 300 Å in thickness directly under (toward the glass substrate from) the infrared reflective metal film furthest from the substrate contributes to a reduction in UV transmission and is preferred.

In one embodiment, the film stack includes a thin film of niobium as a barrier film on both sides of the infrared reflective film, the latter being sandwiched between and in direct contact with the niobium films. The sandwich structure thus described desirably is received between films of a nitride such as silicon nitride. Upon tempering the glass product, at least some nitriding of the niobium films occurs.

In a preferred embodiment, the film stack contains two infrared reflective films and includes, from the glass substrate outwardly, a film sequence comprising a metal oxide barrier film, a transparent infrared reflective silver film, a niobium metal barrier film not greater than about 25 Å in thickness, followed by a repeat of said film sequence, and a protective film, preferably an outermost film, of transparent silicon nitride. Most preferred is a film sequence comprising, from the glass substrate outwardly, a metal oxide barrier film, a transparent infrared reflective film, a protective niobium barrier film up to 25 Å in thickness, a metal oxide barrier film, a second transparent infrared reflective film, and a second protective niobium barrier film up to 25 Å in thickness. The minimum thickness of each niobium film is such that, following tempering and associated conversion of some of the niobium to the oxide, nitride or other niobium compound, there yet remains a protective film of niobium metal over each infrared reflective film. The thickness of the niobium films preferably ranges from 7 to 20 Å. Desirably, each infrared reflective metal film is directly followed (from the glass substrate outwardly) by a contiguous sequence of a niobium metal barrier film up to 25 Å in thickness and a metal oxide film, preferably zinc oxide, each such sequence being followed by a protective nitride film, preferably silicon nitride. Moreover, the outermost (away from the glass substrate) silicon nitride film has directly beneath it a film of titanium nitride ranging in thickness from about 15 to about 40 Å in thickness, the latter having the effect of reducing the appearance of color of the film stack.

In another embodiment, the invention relates to a method for manufacturing a transparent glass article comprising depositing on a surface of a glass substrate a transparent film stack comprising, from the glass surface outwardly, a transparent infrared reflective metallic film, a protective niobium metal barrier film up to 25 Å in thickness and preferably in the range of 7–20 Å, and a transparent nitride film, and heat tempering the article to partially but not fully convert the niobium barrier film to niobium nitride.

In yet another embodiment, the invention relates to a self-cleaning oven that has a window comprising a heat tempered glass sheet bearing a transparent film stack capable of withstanding repeated escalations of temperature up to 900° F. in an oven environment without significant deterioration. The film stack comprises, from the glass substrate outwardly, a transparent infrared reflective metallic film and a protective barrier film of niobium metal up to 25 Å in thickness and preferably in the thickness range of about 7 to 20 Å. Preferably, the film stack includes a protective film of a metal oxide between the glass substrate and the reflective metallic film, and preferably additionally includes a film of silicon nitride over the outermost niobium film.

Tempered glass articles of the invention can desirably exhibit a visible light transmissivity of at least 65% and preferably 70% or more, and a reflectance of above 60% and preferably above 85% in the wavelength range of 3 to 10 microns, which values are appropriate for windows for so-called self-cleaning ovens.

DETAILED DESCRIPTION OF THE PREFERRED EMBODIMENTS

Figures 1, 2:
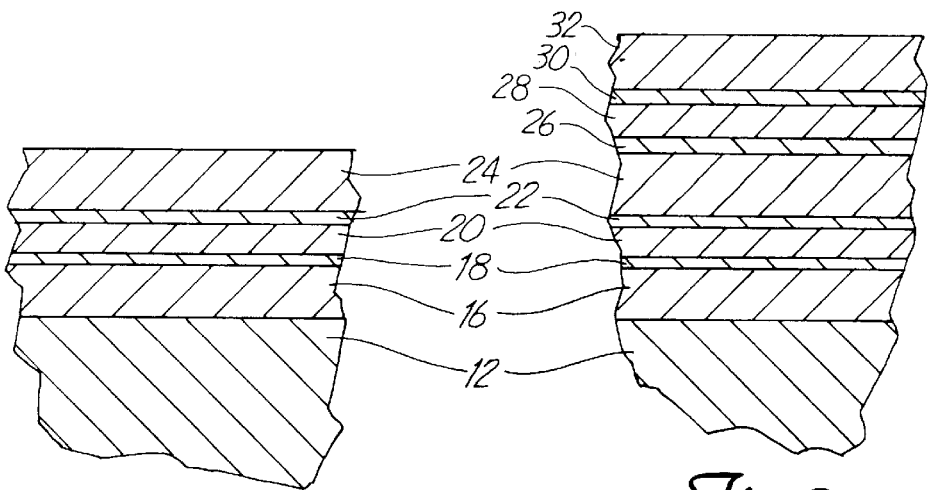
FIG. 1 is a cross-sectional, schematic view of a film stack of the invention.
FIG. 2 is a cross-sectional, schematic view of a modified version of the film stack of FIG. 1.

Referring first to the film stack shown in FIG. 1, a glass substrate is shown as 12. Upon its surface 14 is deposited, in sequence, a nitride film 16, a protective barrier film 18 of niobium metal, an infrared reflective metallic film 20 of, for example, silver, a protective barrier film 22 of niobium metal, and a nitride film 24. It will be understood that the thicknesses of the various films or films in the drawing are not to scale.

The individual films of the film stack may be deposited upon the glass substrate 12 by any convenient means. A preferred deposition method involves D.C. magnetron sputtering, as described in Chapin U.S. Pat. No. 4,166,018, the teachings of which are incorporated by reference. Magnetron sputter deposition involves transporting a glass substrate through a series of low pressure zones in which the various films that make up the film stack are sequentially applied. Metallic films are sputtered from metallic sources or "targets". A metal film may be formed by sputtering from a metal target in an inert gas atmosphere such as argon, whereas a nitride film such as silicon nitride may be sputtered utilizing a silicon target in a reactive atmosphere containing nitrogen gas. The thickness of films that are thus deposited may be controlled by varying the speed of the glass substrate through a coating compartment and by varying the power and sputtering rate.

Another method for depositing thin protective films and nitride films upon a substrate involves plasma chemical vapor deposition, and reference is made to Johncock et al., U.S. Pat. No. 4,619,729 and to Hudgens et al., U.S. Pat. No. 4,737,379 for descriptions of this known process. Plasma chemical vapor deposition involves the decomposition of gaseous sources via a plasma and subsequent film formation onto solid surfaces such as glass substrates. Film thickness is adjusted by varying the speed of the substrate as it passes through a plasma zone, and by varying the power and the gas flow rate.

As the infrared reflective metal film, silver or silver-containing films are preferred. Silver film thicknesses ranging from about 55 Å to 190 Å have been found appropriate. Thicknesses in the range of about 120 Å to about 180 Å for film stacks having but a single silver film are preferred in order to provide a high level of reflectivity of infrared radiation. The thicknesses of silver films in film stacks containing two silver films, as will be described in connection with FIG. 3, may range from 60 Å to 190 Å, with the outer silver film being thicker than the silver film closer to the glass substrate. Preferably, the thickness of the infrared-reflective silver film(s) is such as to provide reflectance values of above 60% and preferably above 85% in the three to ten micron range for application in a self-cleaning oven door and to provide for low emissivity and solar control for window applications.

Nitrogen and oxygen must be substantially prevented from coming into reactive contact with transparent, infrared reflective films such as silver at glass tempering temperatures, and the thin barrier film of niobium metal over each silver film is believed to be capable of chemically reacting with and thus capturing nitrogen and oxygen to form nitrides and oxides of niobium and thus prevent reaction with the silver reflective film at high temperatures. A niobium barrier film beneath a silver or other infrared reflective film may be replaced with a metal oxide film such as zinc oxide sufficiently thin (from 25 to 250 Å) as not to be a significant source of oxygen in itself or to create increased haze and to provide for higher transmissivity of the final product. Niobium readily reacts with nitrogen and oxygen at high temperatures to form the nitride and oxide of niobium. Of the various nitrides that can be used, silicon nitride is preferred.

The protective barrier films 18, 22 of niobium metal (and the metal oxide films described with reference to FIG. 3) arc deposited at a thickness sufficient to protect the metallic reflective film from degradation at high temperatures but not so great as to cause undue reduction in visible light transmissivity, reduction in emissivity, or increase in haze. When a glass substrate having a film stack of the invention is raised to a high temperature (as during tempering), such properties as the color of the stack is essentially unaffected. Any slight changes in properties is believed to be a result of the partial nitriding or oxidation of the thin niobium barrier films. Thicknesses on the order of 14 Å for the protective niobium metal films have given acceptable results; thicknesses up to 25 Å, preferably in the range of in the range of 7 Å to 20 Å may be employed, with thicknesses in the range of about 12 Å to about 18 Å being more preferred. The protective niobium film, if any, between the infrared reflective film and the glass substrate may be several Angstroms thinner than the other niobium barrier film, and desirably the niobium metal films are deposited only to the thickness needed to protect the metallic reflective film in order to avoid undue reduction in transmissivity.

Referring again to FIGS. 1 and 2, the nitride films 16, 24 on either side of what may be termed the "inner sandwich" (formed by sandwiching the infrared reflective metallic film between the thin niobium barrier films) preferably is silicon nitride. Silicon nitride has the benefit of being highly transmissive of visible light and of imparting substantial chemical and physical durability to the film stack. The nitride films serve as antireflection films. The silicon nitride film 14 that is deposited over the "inner sandwich" is preferably on the order of about 250 Å to about 600 Å in thickness, and a thickness of 300 Å is quite acceptable. Any silicon nitride film 16 positioned between the glass substrate and the inner sandwich may be on the order of 250 521 to about 500 Å in thickness, with acceptable results having being obtained at a thickness of about 350 Å.

A film stack of the invention may be prepared utilizing a magnetron sputtering apparatus as referred to above, by sputtering onto a glass substrate a nitrogen-reactive element such as silicon from a target in a nitrogen-containing reactive atmosphere in a first low pressure compartment to form a nitride film, then conveying the glass substrate to one or more further low pressure compartments for the deposition of the thin niobium films from a niobium target in a non-reactive (e.g., argon) atmosphere (or a metal oxide protective film), followed by a film of silver metal or other infrared reflective metal, followed by a second niobium metal barrier film. The glass substrate then is conveyed into another low pressure compartment containing a reactive nitrogen atmosphere, and sputtering from a target causes deposition of a nitride film upon the thus described structure.

When the nitride films on either side of the inner sandwich are of silicon nitride, tempering the coated glass product at temperatures in the 700° C. range followed by air quenching may result in an increase in transmissivity of visible light, e.g., by about four to ten percent. The metals for the reflective film, the thicknesses of the niobium barrier films, and the compositions of the dielectric films are so chosen as to yield a glass product which, after tempering in the 700° C. range, exhibits a transmissivity to visible light (Illuminant C) of not less than about 65% and preferably not less than about 78%, and exhibits slight if any, change in transmitted or reflected color and other optical properties upon such high temperature treatment.

Without being bound by the following explanation, it is postulated that when a nitride film such as silicon nitride is formed by magnetron sputtering or by chemical vapor deposition or the like, the resulting silicon nitride may have an amorphous structure enabling the adsorption or absorption of nitrogen gas, or perhaps both, in the course of laying down that film. When the film stack is heated to glass tempering temperatures, the nitrogen gas from the nitride films escapes from these films, and at such high temperatures would be very reactive with the silver infrared reflective film. It is believed that it is this highly reactive nitrogen gas emitted from the nitride films that is captured by the thin, barrier films of niobium metal. Since tempering commonly occurs in air (an oxidizing atmosphere), some reactive oxygen gas may penetrate the outermost nitride film but, as with reactive nitrogen gas, the oxygen also is scavenged by the underlying protective niobium film to form the oxide with that element.

When one or more nitride films such as silicon nitride are employed in the film stack of the invention, it has been found desirable to separate each nitride film from a neighboring silver film by a metal oxide film, zinc oxide being preferred. It appears that zinc oxide tends to improve adhesion between silver and nitride films, and it is preferred to employ a zinc oxide film in the thickness range of 25 to 180 Å beneath each silver film (that is, on the side of the silver film facing the glass substrate), and zinc oxide films on the order of about 100 Å are preferred.

It will be understood that other and further films may be employed in the film stack of the invention. Particularly, one or more films may be employed as an undercoat between the surface of the glass substrate and the first nitride film, and also over the other nitride film(s).

Preferably, the "inner sandwich" structure consists of a silver film sandwiched between two barrier films of which one, on the side of silver film facing away from the substrate, is niobium metal and the other, on the side of the silver film facing the substrate, is a metal oxide such as zinc oxide or, less preferably, is a niobium metal film, the silver and the barrier films being contiguous, that is, touching. If both barrier films are niobium metal, they desirably each are present at a thickness of up to 20 Å in thickness, the niobium film nearer the glass substrate preferably being slightly thinner, e.g., by several angstroms, than the other niobium film.

In one preferred embodiment, the metal nitride films between which the "inner sandwich" structure is received are contiguous to the respective barrier films, so that the film stack comprises the following films in sequence from the glass substrate outwardly, and with neighboring films being in contact with each other: silicon nitride—niobium—silver—niobium—silicon nitride. A typical film stack of the invention includes the following:

a. A silicon nitride film having a thickness of 150 Å to 450 Å.

b. A first barrier film of niobium metal deposited upon the first silicon nitride film and having a thickness in the range of 7 Å to 20 Å.

c. An infrared-reflective film of silver deposited upon the first niobium barrier film and having a thickness in the range of 120 Å to 180 Å.

d. A second barrier film of niobium metal deposited upon the infrared-reflective silver film and having a thickness in the range of 7 Å to 20 Å, e. A silicon nitride film having a thickness in the range of 200 Å to 600 Å.

If desired, films b through d may be repeated, with appropriate adjustments in film thicknesses to obtain the desired transmissivity and emissivity. An example of a single repeat of films b through d is illustrated in FIG. 2, in which there is deposited over a film stack shown in FIG. 2 (that is, films 16, 18, 20, 22, 24) a third film of niobium metal 26 having a thickness in the range of 7 Å to 20 Å, a silver film 28 having a thickness in the range of 110 Å to 190 Å, a fourth niobium film 30 in the range of 7 Å to 20 Å, followed by a silicon nitride film 32.

Figure 3:
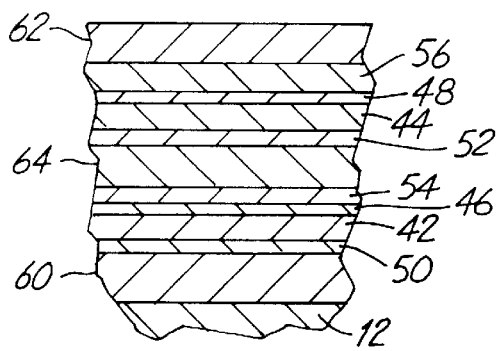
FIG. 3 is a cross-sectional, schematic view of another film stack of the invention.

FIG. 3 illustrates a preferred film stack utilizing two silver films 42, 44, each having a respective niobium metal barrier film 46, 48 deposited on the surface of each silver film facing away from the glass substrate 12. The silver film 44 further from the substrate desirably is thicker (preferably in the range of 130 to 170 Å) than the nearer silver film 42, the latter having a thickness preferably in the range of 60 to 100 Å. On the other side of each silver film (the side facing the substrate 12) is a respective zinc oxide film 50, 52 having thicknesses in the range of 25 to 180 Å sufficient to protect the contiguous silver films during heat treatment. Nitride films, preferably films of silicon nitride, are provided on the substrate (film 60, at a thickness of 50–300 Å), as a protective outer coating (film 62, at a thickness of 100–400 Å) and between metal oxide films 52, 54 (film 64, at a thickness of 100–800 Å). The initial nitride film may be omitted if desired, and the zinc oxide film beneath the first silver film may accordingly be increased in thickness to 100 Å to 250 Å.

In the embodiment illustrated in FIG. 3, note may be made of the presence of a repeating film sequence, the first sequence comprising, from the glass outwardly, $Si_3N_4$, ZnO, Ag, Nb, and ZnO and the second sequence of the same materials being formed on the first sequence. Note also that a metal oxide film (ZnO in this example) here is positioned between each $Si_3N_4$ film and a neighboring silver film; that is, ZnO film 50 is positioned between $Si_3N_4$ film 60 and silver film 42, $Si_3N_4$ film 64 is separated from silver films 42 and 44 by ZnO films 54 and 52, respectively, and $Si_3N_4$ film 62 is separated from silver films 44 by ZnO film 56.

Figure 5:
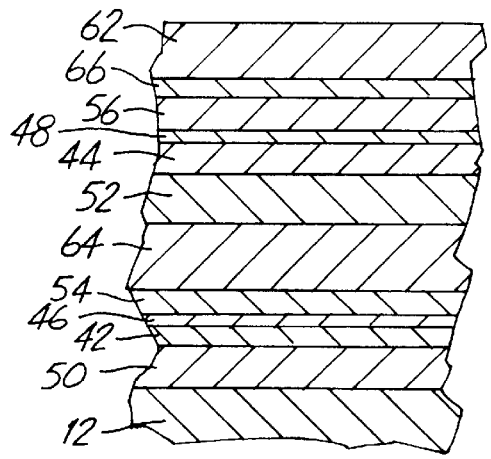
FIG. 5 is a cross-sectional, schematic view of another film stack of the invention.

It may be noted particularly that there is a film of zinc oxide (54, 56) over each niobium film (that is, on the side of the niobium film facing away from the glass substrate) and beneath each nitride film, and it has been found that this structure tends to increase transmissivity of the film stack and to improve adhesion between the niobium and nitride films that are contiguous to these zinc oxide films. It is contemplated that other oxide films, such as oxides of titanium, niobium and aluminum may also be used for this purpose Another preferred embodiment of the invention is shown in FIG. 5. This embodiment is similar to that shown in FIG. 3, except that the initial nitride film on the glass substrate surface has been omitted and a film 66 of titanium nitride has been provided between the outer nitride film 62 and the next adjacent niobium metal barrier film 48, the titanium nitride film preferably being contiguous to the nitride film 62 and having the effect of reducing transmissivity and improving the visually colorless aspect of the film stack. In turn, in FIG. 5, the metal oxide film 52 directly under the second silver film, may be increased in thickness to a range of 100 to 300 Å to offer a further reduction in UV transmissivity.

Example 1

Utilizing a commercial DC magnetron sputtering coating apparatus (Airco), cleaned glass sheets 3 mm in thickness were passed through a series of sputter-coating low pressure compartments to deposit a series of contiguous films on the glass surface, as depicted in FIG. 1. Film thicknesses were determined by sputtering rates. In one coating compartment containing a low pressure atmosphere of argon and nitrogen, silicon was sputtered to provide a first film of silicon nitride 330 Å in thickness directly onto the glass surface. Directly upon the silicon nitride film was deposited a niobium film at a thickness of 12 Å from a niobium target, followed directly by a 110 Å thick film of silver from a silver metal target, and a niobium film at a thickness of 12 Å from a niobium target, the niobium and silver films being deposited in low pressure argon atmospheres. Directly on the last mentioned niobium film was deposited a fifth film, 410 Å in thickness, of silicon nitride in the manner described above with regard to the first film. The resulting glass article was heated to approximately 700° C. in a tempering furnace and then immediately air quenched. Transmissivity measured before tempering was 86%, and after tempering, 89%. Electric surface resistivity, which varies more or less proportionally with emissivity, was measured using a four probe ohmmeter (sometimes called a "four point" measurement). Surface resistivity before tempering was measured as 7 ohms/square, and after tempering, 5 ohms/square, signifying a reduction in emissivity.

Example 2

Utilizing the apparatus and targets described in Example 1, but additionally providing for the deposition of zinc oxide using a zinc target in an atmosphere of argon and oxygen, the following film stack may be produced on a glass substrate:

| Glass | |
|---|---|
| $Si_3N_4$ | 86 Å |
| ZnO | 50 Å |
| Ag | 77 Å |
| Nb | 15 Å |
| ZnO | 90 Å |
| $Si_3N_4$ | 470 Å |
| ZnO | 50 Å |
| Ag | 145 Å |
| Nb | 15 Å |
| ZnO | 90 Å |
| $Si_3N_4$ | 245 Å |

The resulting coated glass products were heated and air-quenched as described in Example 1. Transmissivity was measured at 82% both before and after the heat treatment Example 3

Example 2 was repeated, except that the initial silicon nitride film was omitted, the initial zinc oxide film was accordingly increased in thickness, and other film thicknesses were adjusted The following film stack was produced on a glass substrate, the films being identified from the glass substrate outwardly:

| Glass | |
|---|---|
| ZnO | 135 Å |
| Ag | 65 Å |
| Nb | 15 Å |
| ZnO | 90 Å |
| $Si_3N_4$ | 450 Å |
| ZnO | 90 Å |
| Ag | 160 Å |
| Nb | 15 Å |
| ZnO | 90 Å |
| $Si_3N_4$ | 270 Å |

The resulting coated glass products were heated and air-quenched as described in Example 1. Transmissivity increased from 68 to 76% during the tempering process. Other optical and color properties remained substantially unchanged.

Example 4.

Example 2 was repeated, except that the initial silicon nitride film was omitted, an additional film of titanium nitride was positioned directly under the outer silicon nitride film, and thicknesses of the film were varied, the film stack having the following construction:

| Glass | |
|---|---|
| ZnO | 160 Å |
| Ag | 72 Å |
| Nb | 12 Å |
| ZnO | 100 Å |
| $Si_3N_4$ | 370 Å |
| ZnO | 200 Å |
| Ag | 155 Å |
| Nb | 12 Å |
| ZnO | 95 Å |
| TiN | 25 Å |
| $Si_3N_4$ | 285 Å |

The resulting coated glass products were heated and air-quenched as described in Example 1. Transmissivity increased from 75 to 82% during the tempering process. Using a four point measuring system as described above in connection with Example 2, surface resistivity before tempering was measured as 3.5 ohms/square, and after tempering as 2.5 ohms/square, signifying a reduction in emissivity.

Figure 4:
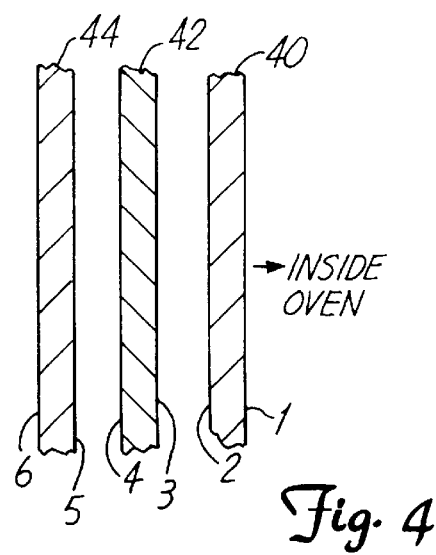
FIG. 4 is a cross-sectional, schematic view taken through an oven window assembly; identifying various surfaces.

FIG. 4 illustrates the use of glass articles of the invention in the window of a self-cleaning oven. By "self-cleaning", reference is made to the type of commercially available kitchen ovens that are adapted to be cleaned by heating the oven cavities to temperatures in the 900° F. range for periods of time ranging from a half hour to an hour or more.

Oven windows are commonly formed in the doors of ovens. A typical window may comprise a plurality of spaced, generally transparent sheets separated by air spaces. Three spaced glass sheets are shown in the embodiment typified in FIG. 5. The surfaces of the sheets are numbered in sequence progressing outwardly from the oven interior, with the number 1 surface being the surface facing the oven interior of the glass sheet 40 nearest the oven interior, and surface number 6 being the surface facing the exterior of the oven of the outermost glass sheet 44. In the embodiment of FIG. 4, glass sheets 40 and 42 may be provided with the transparent film stacks referred to above on their outwardly facing surfaces 2, 4. The outermost sheet 44 may be supplied with a reflective pattern such as a dot pattern, in a manner common to currently available self-cleaning ovens. Because the air spaces between the sheets are not sealed, the coatings on surfaces 2 and 4 must be resistant to high heat and humidity and to chemicals encountered in normal usage.

Prior art oven windows for self-cleaning ovens made use of glass sheets bearing a pyrolytic tin oxide coating on both surfaces. Repeated temperature escalations result in unsightly iridescent blotches. Also, the reflectivity of these coatings is relatively poor, requiring a two-sided coating of the glass sheets in oven doors.

Glass articles of the invention have withstood rigorous testing at high humidity levels with little change in properties. One corrosion test involves 200 hour exposures of tempered sheets to 90% or 100% relative humidity conditions at a temperature of 100° F. Another test involves subjecting the coated glass articles to a 4% aqueous salt spray for 200 hrs at 100° F. Of interest, the durability of the coatings tends to increase rather than decrease upon heat tempering. Moreover, the coatings are quite hard and exhibit substantial resistance to abrasion.

While a preferred embodiment of the present invention has been described, it should be understood that various changes, adaptations and modifications may be made therein without departing from the spirit of the invention and the scope of the appended claims.

What is claimed is:

1. A heat-resistant, temperable glass article comprising a glass substrate and a transparent film stack deposited upon the substrate, said film stack comprising, from the glass substrate outwardly, an infrared reflective metallic film, a protective barrier film of niobium metal deposited directly on the infrared reflective film at a thickness up to 25 Å such that a thin protective film of niobium remains after heat-tempering of the glass article, a film of titanium nitride, and a film of a transparent nitride.

2. The glass article of claim 1 wherein said infrared reflective metallic film is silver.

3. The glass article of claim 1 including a second niobium metal barrier film between said infrared reflective film and the glass substrate and contiguous to the infrared reflective film.

4. The glass article of claim 1 including a metal oxide barrier film between said infrared reflective film and the glass substrate and contiguous to the infrared reflective film.

5. A heat-resistant, temperable glass article comprising a glass substrate and a film stack deposited upon the substrate, said film stack comprising, from the glass substrate outwardly, a metal oxide barrier film, an infrared reflective silver-containing metallic film, a barrier film of niobium metal, a film of titanium nitride, and a film of a transparent nitride, the metal oxide and niobium barrier films being contiguous to the infrared reflective silver film, and the niobium barrier film having a thickness in the range of 7 to 20 Å.

6. The article of claim 5 including a transparent nitride film positioned nearer the said glass substrate than the first barrier film.

7. The transparent heat-resistant glass article of claim 5 wherein said metal oxide barrier film comprises an oxide of a metal selected from the group consisting of zinc, titanium, niobium and aluminum.

8. The transparent heat-resistant glass article of claim 6 including a transparent nitride film nearer the glass substrate than said silver film and separated from the silver film by a sufficient thickness of said metal oxide barrier film as to protect the infrared reflective metallic film from degradation at glass tempering temperatures.

9. The transparent heat-resistant glass article of claim 8 wherein said metal oxide barrier film is present in a thickness ranging from 25 Å to 180 Å.

10. The transparent heat resistant glass article of claim 5 wherein said metal oxide film is contiguous to the glass substrate and is of a thickness in the range of 100 Å to 250 Å.

11. A transparent heat-resistant glass article comprising a glass substrate and a transparent film stack deposited upon the substrate, said film stack comprising a plurality of transparent silicon nitride films, an infrared reflective film positioned between neighboring transparent nitride films, a film of niobium metal 7–20 Å in thickness positioned on the surface of each infrared reflective film facing away from the substrate, a metal oxide film positioned between each transparent silicon nitride film and each infrared reflective film, and a film of titanium nitride between the silicon nitride film furthest from the substrate and the next adjacent niobium barrier film.

12. A transparent heat-resistant glass article comprising a glass substrate and a transparent film stack deposited upon the substrate, said film stack comprising, from the glass substrate outwardly, a first $Si_3N_4$ film 100–400 Å in thickness, a second $Si_3N_4$ film 100–800 Å in thickness, and a third $Si_3N_4$ film 50–300 Å in thickness, an infrared reflective silver film between the first and second $Si_3N_4$ films and between the second and third $Si_3N_4$ films, a film of niobium metal 7–20 Å in thickness positioned on the surface of each infrared reflective film facing away from the glass substrate, and a film of titanium nitride between the silicon nitride film furthest from the substrate and the next adjacent niobium barrier film.

13. The transparent heat-resistant glass article of claim 12 including a protective zinc oxide film positioned between the first $Si_3N_4$ film and the next adjacent infrared reflective silver film and between the second $Si_3N_4$ film and the next adjacent infrared reflective silver film.

14. A transparent heat-resistant glass article comprising a glass substrate and a transparent film stack deposited upon the substrate, said film stack comprising, from the glass substrate outwardly, a transparent silicon nitride film having a thickness of from 125 Å to 500 Å, a first protective film of niobium metal 7 to 20 Å in thickness, a transparent infrared reflective silver film, a second protective film of niobium metal 7 to 20 Å in thickness, a transparent titanium nitride film, and a transparent silicon nitride film having a thickness of from 350 Å to 600 Å.

15. A transparent heat-resistant glass article comprising a glass substrate and a transparent film stack deposited upon the substrate, said film stack comprising a film of silver contiguous to and sandwiched between protective niobium metal films that are 7 Å to 20 Å in thickness; on each side of said sandwich structure, a transparent film capable of liberating nitrogen upon being heated to glass tempering temperatures; and a titanium nitride film disposed between one of said protective niobium metal films and the next adjacent transparent film capable of liberating nitrogen.

16. A transparent heat-resistant glass article comprising a glass substrate and a transparent film stack deposited upon the substrate, said film stack, from the glass substrate outwardly, including a film sequence comprising a metal oxide barrier film, a transparent infrared reflective silver film, a niobium metal barrier film 7 Å to 20 Å in thickness, a metal oxide film, and a film of transparent silicon nitride, and a repeat of said film sequence, and a film of titanium nitride being disposed between the silicon nitride film furthest from the substrate and the next adjacent metal oxide film.

\* \* \* \* \*